Nov. 1, 1932.    W. J. AITKEN    1,885,213
AUTOMOBILE PARKING APPARATUS
Original Filed July 19, 1929    10 Sheets-Sheet 3
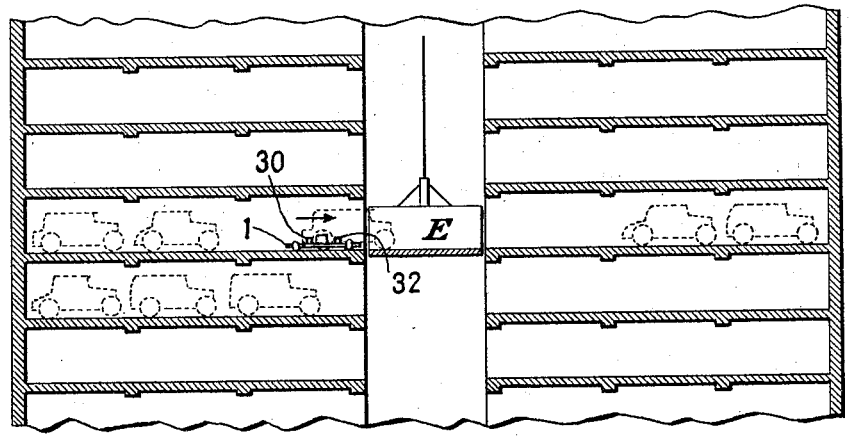
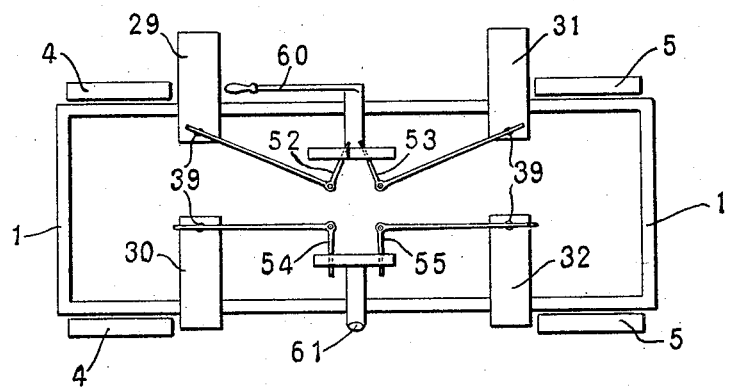
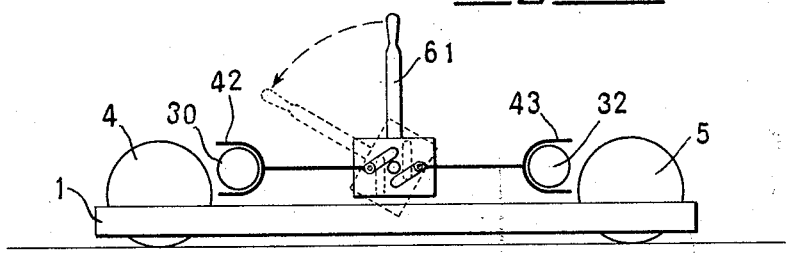
INVENTOR
*William J. Aitken,*
BY
ATTORNEY

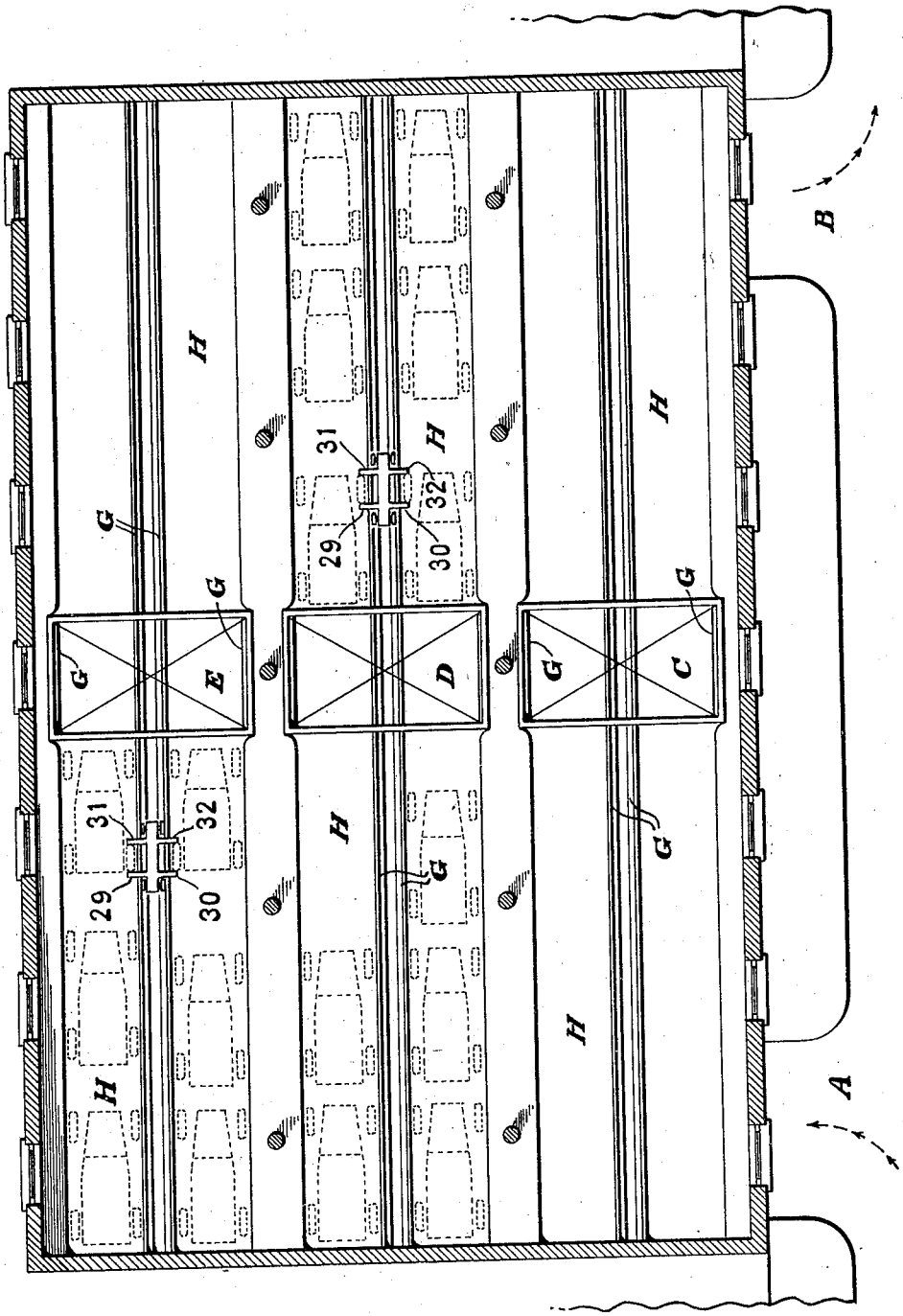

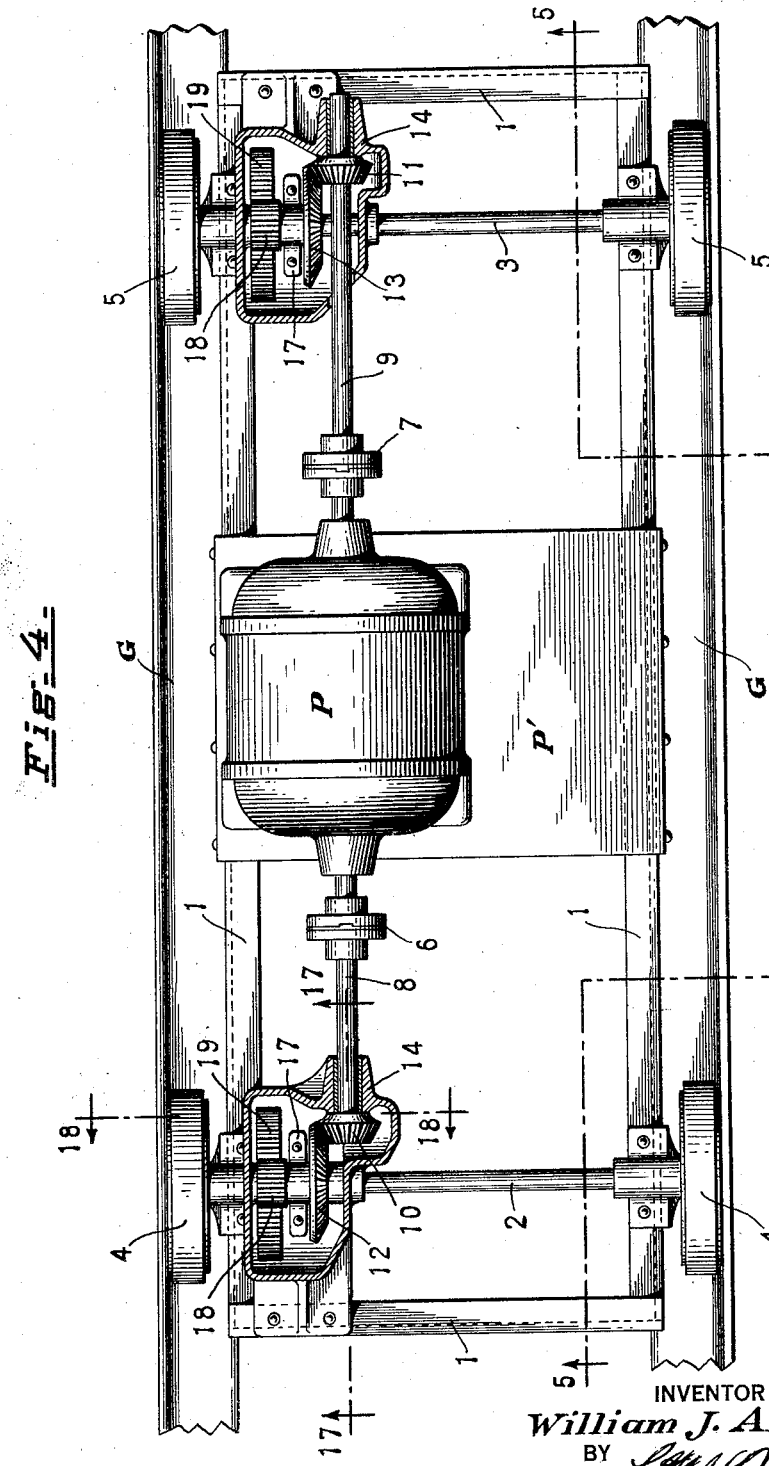

Nov. 1, 1932.  W. J. AITKEN  1,885,213
AUTOMOBILE PARKING APPARATUS
Original Filed July 19, 1929  10 Sheets-Sheet 5

INVENTOR
William J. Aitken,
BY
ATTORNEY

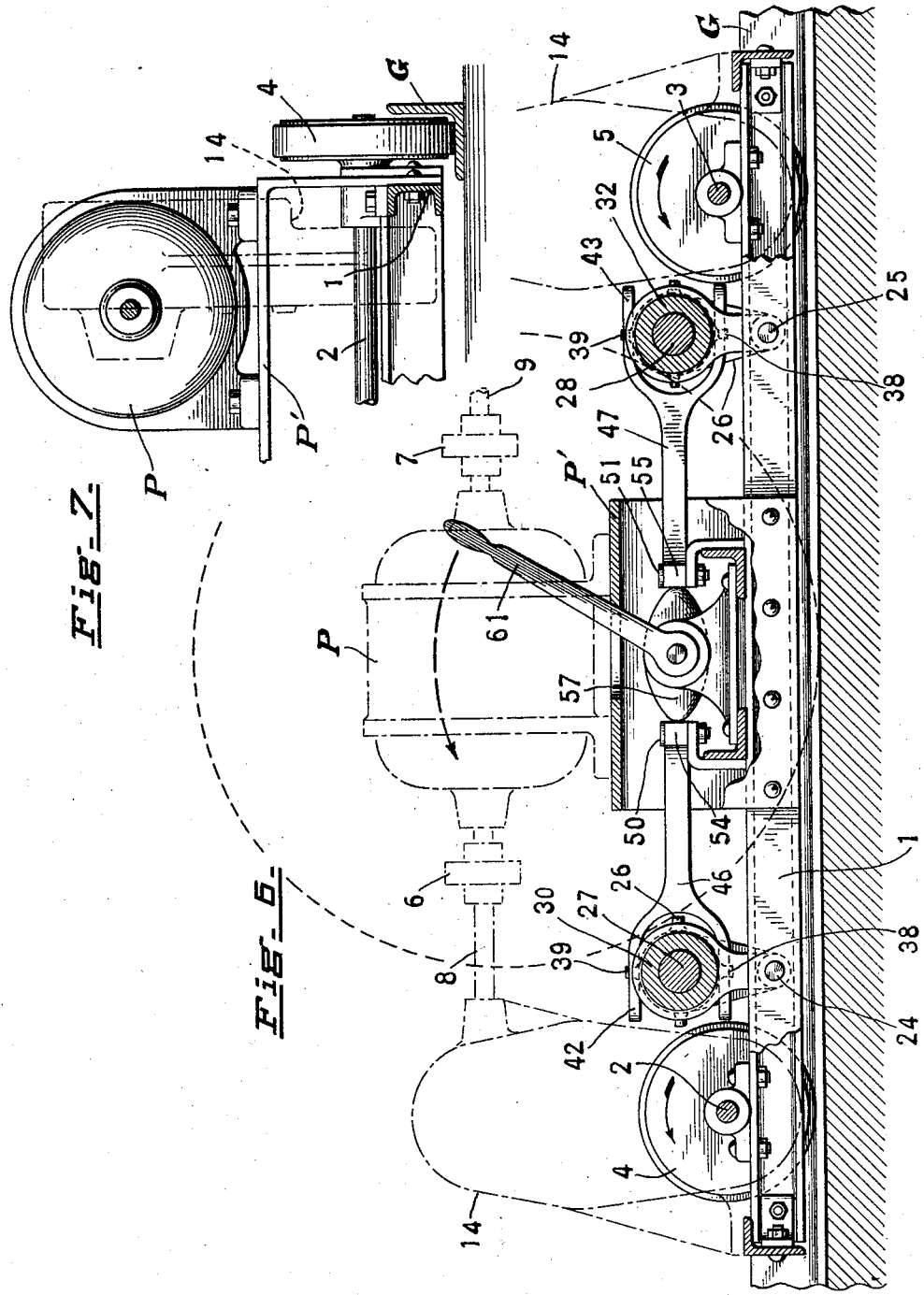

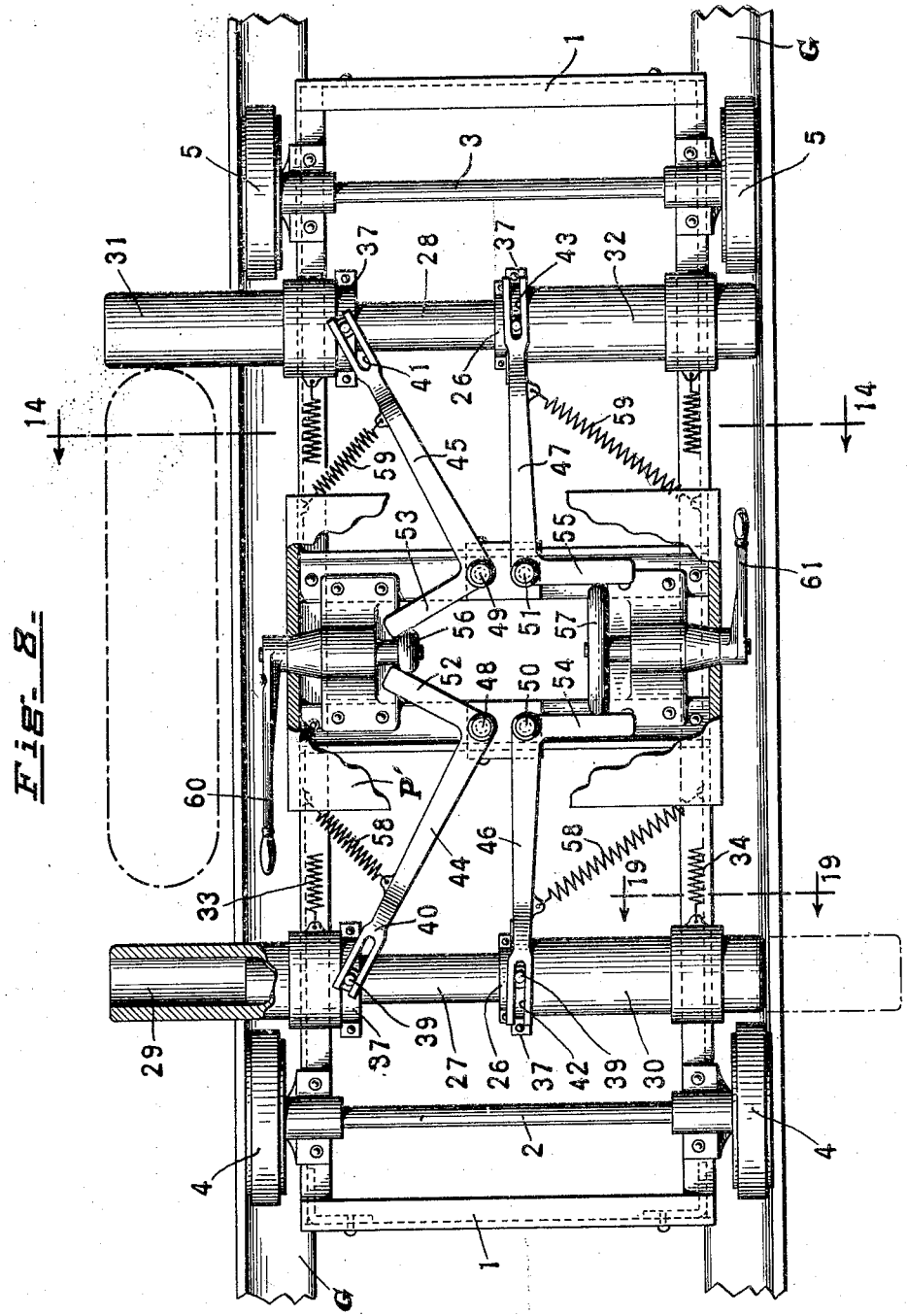

Nov. 1, 1932.  W. J. AITKEN  1,885,213
AUTOMOBILE PARKING APPARATUS
Original Filed July 19, 1929  10 Sheets-Sheet 8
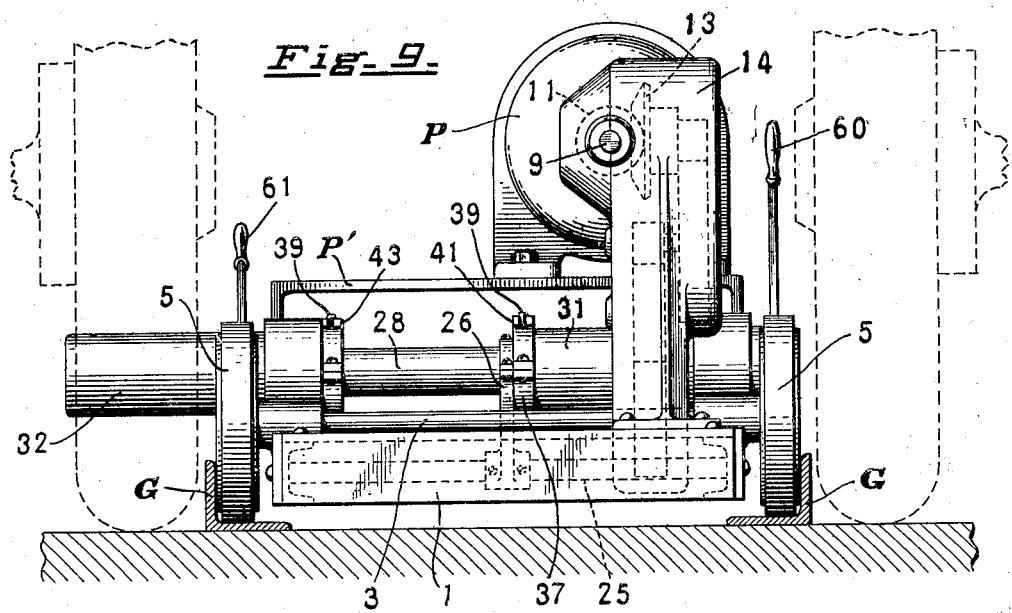
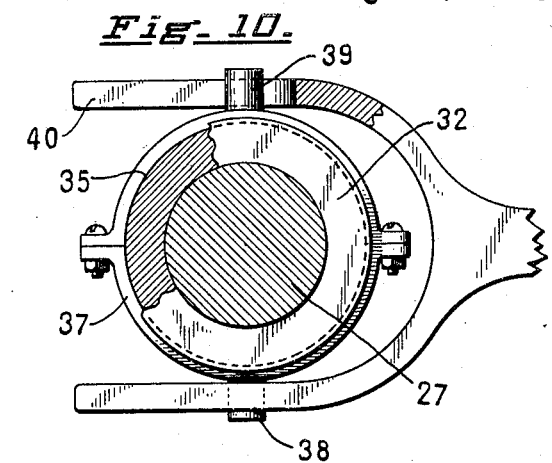
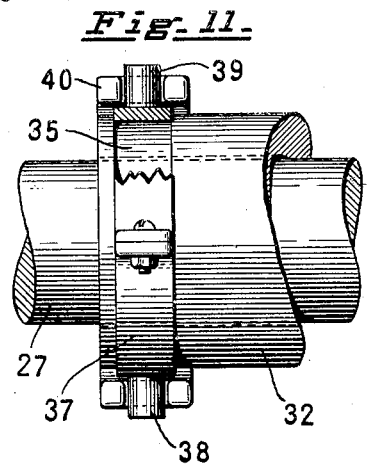
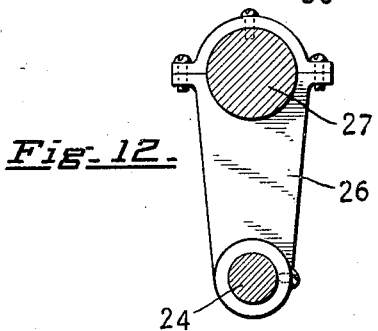
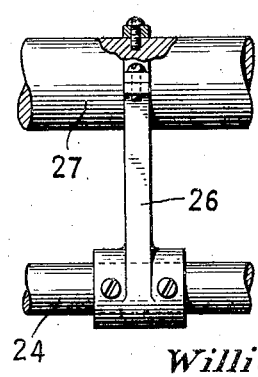
INVENTOR
*William J. Aitken,*
BY
ATTORNEY Nov. 1, 1932.  W. J. AITKEN  1,885,213
AUTOMOBILE PARKING APPARATUS
Original Filed July 19, 1929  10 Sheets-Sheet 9
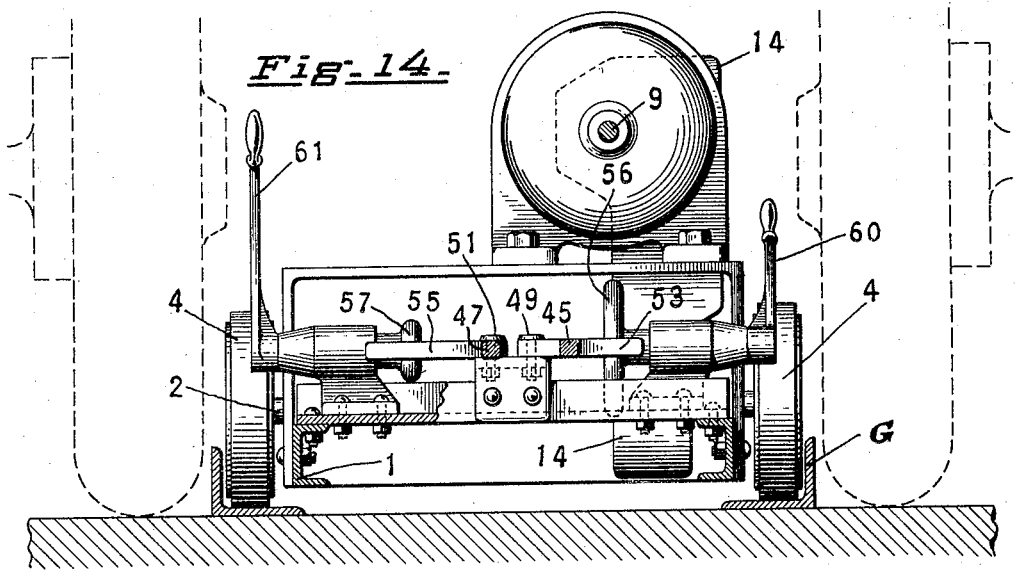
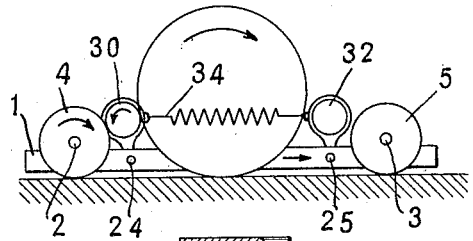
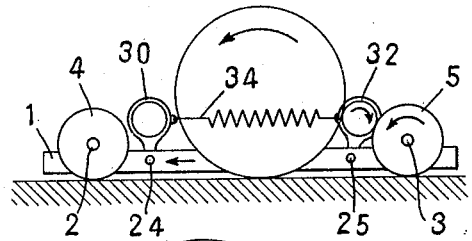
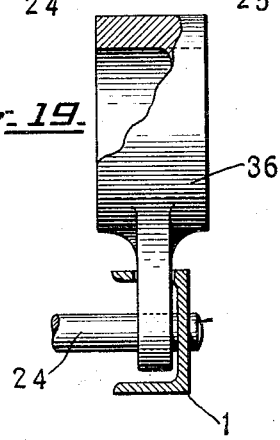
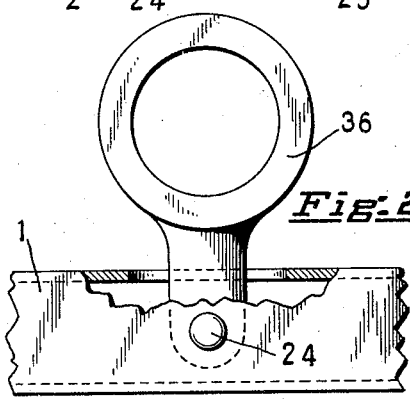
INVENTOR
*William J. Aitken,*
BY
ATTORNEY Nov. 1, 1932. W. J. AITKEN 1,885,213
AUTOMOBILE PARKING APPARATUS
Original Filed July 19, 1929  10 Sheets-Sheet 10
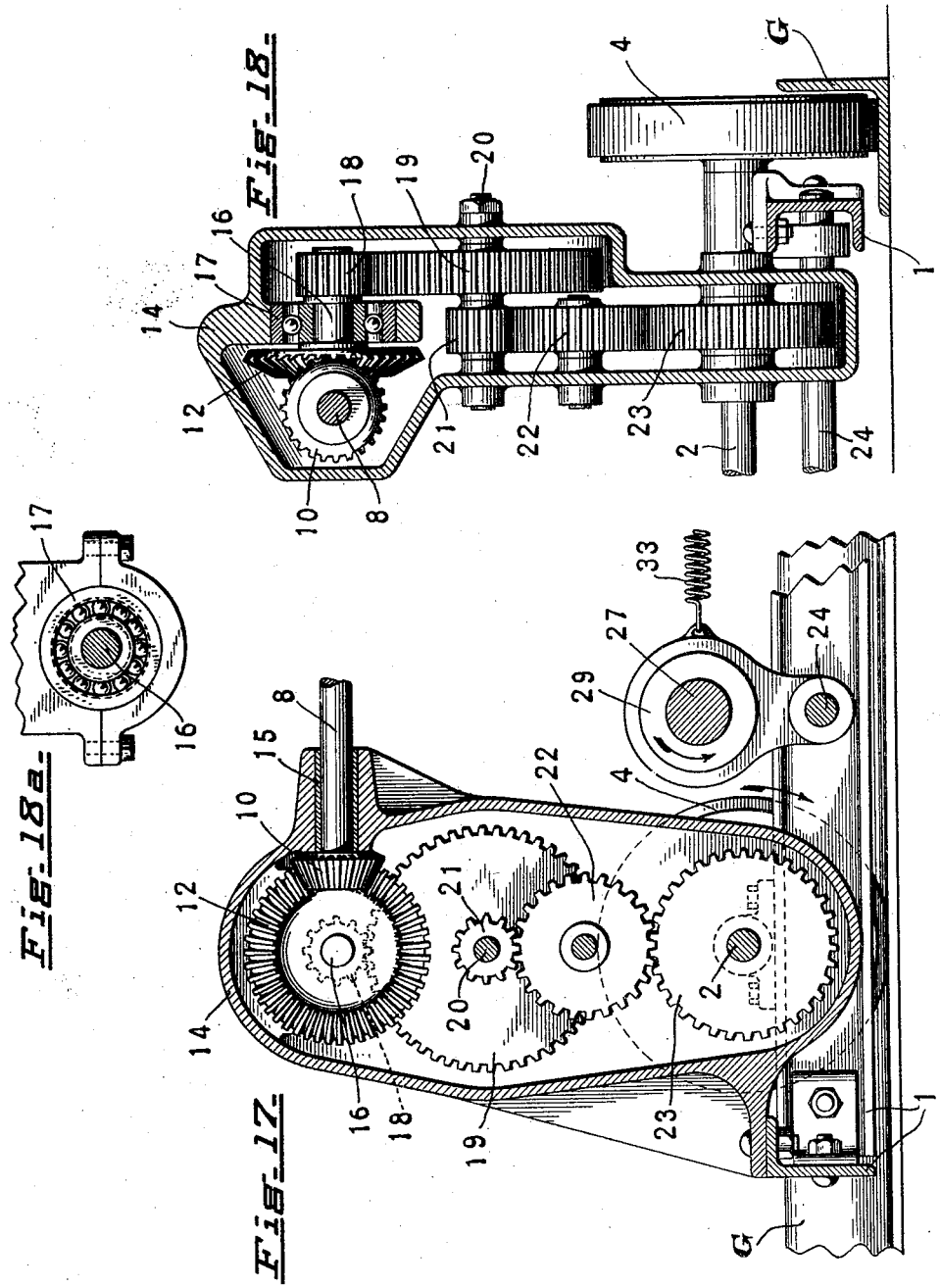
INVENTOR
William J. Aitken,
BY
ATTORNEY Patented Nov. 1, 1932

1,885,213

UNITED STATES PATENT OFFICE

WILLIAM J. AITKEN, OF CHICAGO, ILLINOIS, ASSIGNOR, BY MESNE ASSIGNMENTS, TO NATIONAL PARKING GARAGES, INCORPORATED, A CORPORATION OF DELAWARE

AUTOMOBILE PARKING APPARATUS

Original application filed July 19, 1929, Serial No. 379,509, now Patent No. 1,803,583, dated May 5, 1931. Divided and this application filed September 25, 1930, Serial No. 484,273.

This application is filed as a division of my application, Serial No. 379,509, filed July 19, 1929, for automobile handling and storing apparatus which is now Patent No. 1,803,583 dated May 5, 1931.

As set forth in my prior application, the objections to the usual parking of cars in garages and other buildings, is largely if not entirely overcome by the use of the present invention.

The main object of the present invention is to overcome the objections of manually handling automobiles either by their owners or attendants, when placing them in garages. To do this requires an efficient apparatus which will have an ability to engage one or a plurality of automobiles and move them onto and off from elevators, to be delivered to any desired space of a multi floor building.

This entirely does away with ramps and gives a greater storage space per area of building than is possible with ramps.

It is a further object of the invention to provide a parking device having its own motor power, which power may be directly exerted and translated through a proper intermediate driving mechanism to rotate the wheels of an automobile in either direction. This permits rolling the automobile backward or forward on its own tires.

The arrangement is such that the automobile provides traction for the parking device and the parking device imparts a direct thrust or pushing movement to the automobile, while it is translating power to the wheels of the automobile for rolling them.

One of the chief requirements of automatically parking cars is the time element involved in moving the cars to and from the elevators.

In modern elevator constructions, little or no time is lost in raising or lowering the cars and it is, therefore, highly important that the automobiles be automatically moved onto and off from the elevators with the greatest facility and at a minimum interval of time.

It is, therefore, the object of the invention to obtain the above indicated results.

It is also an object to provide great elasticity of action in the operation of the parking device. To this end, the parking device is designed so that it does not, of necessity, have to engage some particular part of the under gear, axles or housings of the automobile, but engages the tires of the automobile.

The engaging arrangements are such that a tire on the automobile may be engaged at one side of the parking device and the parker then moved with its load to engage the wheel of a second automobile, on the opposite side of the parker, so that both may be moved simultaneously on to and off from a lifting apparatus or along the parking spaces of the garage.

There is a very advantageous result attained, resulting in a further object of improvement, namely, that of moving the automobiles by transmitting power to the wheels, thus relieving all strain on the automobile parts.

There is no lifting pressure exerted on the front or rear axle parts, as is the case where a parker is compelled to run under the automobile to engage it. This brings about an object of great importance. The parking device never runs below the car and therefore never becomes soiled from the drip of water, oil and mud from the car.

It operates at the side of the automobile and engages the wheels or tires thereof. As a result, there is no height limit in the building of the parker, as no clearances have to be figured for running under the automobile.

The parking device will adjust itself for the moving of cars of long or short wheel base and large or small tires and it is, therefore, universal in its application.

Other objects of the invention will be apparent as they are further pointed out in the specifications and claims.

Referring to the drawings:

Fig. 2 is a typical floor plan of one of the upper floors of a garage illustrating the operation of the parker and the emplacement of automobiles.

Fig. 3 is a fragmentary diagrammatic sectional view through a number of the upper floors on the line 3—3 of Fig. 1.

Fig. 4 is a plan view of the parker device with parts broken away and without the control mechanism.

Fig. 6 is a sectional view in side elevation showing the method of controlling the power transmitting rolls.

Fig. 7 is a detailed sectional view of the motor support.

Fig. 8 is a plan view without the motor and gearing, showing one set of power transmitting rolls projected in position to act upon the tire. The second set of transmitting rolls is in normal inactive position.

Fig. 9 is an end elevation of the parking device shown in Figure 5, with one power transmitting roll extended.

Figure 10 is an enlarged detail, partially broken in section, of the fork and appurtenant parts for moving the transmitting rolls.

Figure 11 is a similar view in side elevation.

Figure 12 is a detail of the central support for the shaft of the transmitting rolls.

Figure 13 is a side elevation of the part shown in Figure 12.

Figure 14 is a cross sectional view on the line 14—14 of Figure 8.

Figure 15 is a diagrammatic view showing the driving elements of the parker in engagement with an automobile wheel and driving it in one direction.

Figure 16 is a similar view showing the drive in the opposite direction.

Figure 17 is an enlarged sectional view on the line 17—17 of Figure 4, showing the gear transmission from the motor shaft to the driving wheels of the parking device.

Figure 18 is a similar view on the line 18—18 of Figure 4.

Figure 18a is a detailed view of the bevel gear bearing.

Figure 19 is an enlarged sectional detail on the line 19—19 of Figure 8, showing the rocker arm of the transmitting rolls.

Figure 20 is a side elevation of the part shown in Figure 19.

Figure 21 is a somewhat diagrammatic plan view of a positive means for actuating the power transmitting roll levers.

Figure 22 is a similar face view.

In illustrating my invention, I have chosen to show an electric motor as a power unit for driving the parking device, this being a convenient type of apparatus for the purposes.

I have not illustrated the various electrical connections for the motor, nor the details of the electrical apparatus and connections for the elevators which carry the parker and its automobiles (to be parked) to the various floors of the building, as such connections and elevating apparatus need no detail description or illustration herein. Furthermore, in showing a characteristic application of my inventions, I have illustrated a building having three elevators, thus providing for the handling of six cars during any one given period of time.

Of course, the parking device may pick up a single car or deliver a single car, as the case may be, but it has a capacity along with its elevator, for handling a plurality of cars. I have chosen to illustrate it as handling two cars, although obviously, the parker might be doubled in capacity by duplication of its parts, as illustrated herein.

Figure 1:
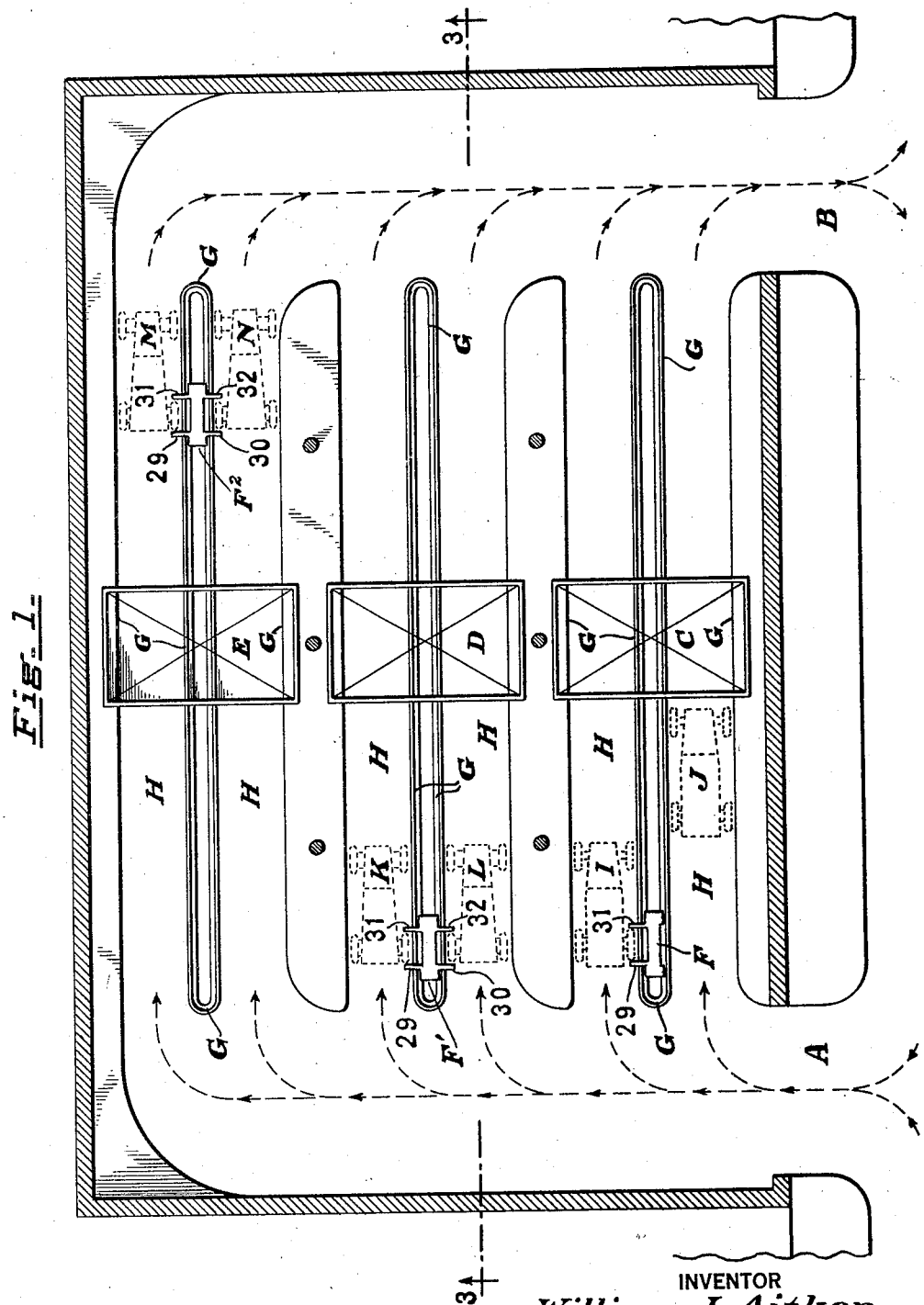
Fig. 1 is a typical ground floor plan illustrating the operation of the parker, and showing the entrance and exit for automobiles.

Obviously, provision must be made for entrance to and exist from the building and this is best illustrated in the type of building herein shown in Figure 1, where A, indicates the entrance and B, the exit.

As illustrated, there are three elevators C, D, E, which, of course, are suitably arranged to carry their load from the ground floor adjacent to the entrance A, to any of the upper floors of the building.

For each elevator, there is a parking unit F, $F^1$, $F^2$, which parking unit runs within a guide way G, both at the entrance side and exit side of the elevators. There is also provided a similar guide way on the elevators C, D, E.

There are also guide ways H, one on each side of the guide ways G. These also are carried on to the elevators and are arranged on opposite sides of the elevators respectively, at the entrance and exist sides.

Each floor of the building is provided with similar guide ways both for the parking device and for the automobiles to be parked and these guide ways extend to the full length or breadth of the building, as the case may be, on opposite sides of the elevators or elevator shafts.

Of course, the length of trackage or guide ways largely determines the capacity of the parking space of the building.

The parker F, is illustrated as having engaged the wheel of an automobile I, at one side and in its passage toward the elevator, corresponding engaging means may be projected to engage the wheel of the automobile J.

The parking device $F^1$, is illustrated as having engaged the automobiles K, L, for simultaneously rolling them to the elevator. The parker $F^2$, is shown as delivering the automobiles M, N.

It is believed that the method of handling is quite apparent from the above brief outline.

Automobiles are driven into the entrance and left in one of the guide ways H. Parking devices are then moved into position to engage the wheel of the automobiles and transmit power thereto for rotating the wheels, thus carrying them forward on to the elevators. The elevators then rise to the desired floor and the parker moves forward carrying the automobiles from the elevator along the guide ways to a given position. The parker is then disconnected from its driving position and may be moved back and forth for moving cars into the guide ways or it may be moved onto the elevator and carried to any desired floor, where it may pick up one or a plurality of automobiles, rolling them to the elevator, to deliver them to the ground floor in the guide ways at the exit side of the building.

Of course, the owner merely drives his car into the guide ways and on entering locks the car securely and it need never be unlocked or tampered with until it is delivered to him at the exit side of the building.

The guide ways for the parking devices may very conveniently be formed of angle iron and these angle irons also serve as a convenient guide for the tires of the automobiles.

Of course, any particular form of trackage may be selected to meet any given requirement of guiding the automobiles along guide ways.

Of course, the matter of guide ways is one of selection, but there is some advantage in using the angle irons shown and described, as they may be placed directly upon the structural steel of the buildings and the floors laid in any required or desired fashion of fire proofing.

The floor filling, aside from the guideways, carries no load.

In the accompanying drawings, the automotive device for supplying the power for moving the automobiles is for convenience, termed a "parker". It is of comparatively simple and sturdy construction and is illustrated as utilizing an electric motor for developing the necessary power.

Obviously, any form of power, as for instance, hydraulics or compressed air, might be utilized and would fall within the scope of the invention.

The parker consists of a sturdy frame 1, conveniently made of channel irons which forms a complete chassis for supporting a motor P, which, for convenience, is raised above the channel iron frame upon a motor stand P'.

There is a driving axle 2, 3, adjacent to each end of the frame 1, which axles carry the driving wheels 4, 4, and 5, 5.

The motor shaft is connected through couplings 6, 7, with extension shafts 8, 9, each of which bears a bevel pinion 10, 11, meshing with bevel gears 12, 13.

As the reduction gears at each end of the parker are identical in arrangement, description is confined to a single gear reduction.

There is a casing 14, bolted to the frame 1, and having a bearing 15, for the shaft 8. Within this casing is mounted the bevel gear 12, which is meshed with the bevel pinion 10. This gear 12, has its shaft 16, provided with a ball bearing 17, which is housed in the casing and clamped therein, as best illustrated in Figures 18, and 18a.

Beyond the bearing and secured to the shaft 16, is a pinion 18, meshing with the gear 19, upon a shaft 20, which shaft also bears a pinion 21, that in turn meshes with an intermediate gear 22. The latter meshes with the gear 23, which is secured to the shaft 2, and drives the wheels 4, 4.

These wheels may be of comparatively large diameter inasmuch as the parker does not run under the automobile, but runs alongside of it. Likewise, the gear parts and motor may be of ample size, as they are not limited by the heighth of the automobile to be parked.

Of course, the gear transmission illustrated is merely exemplary, and any desired and efficient drive may be interposed between the source of power P, and the axle shafts 2, 3.

Parallel to each of the driving axles 2, 3, are shafts 24, 25, which at their ends are supported in the longitudinal channel members of the frame 1. They serve as rocker shafts and at their center have a support 26, for shafts 27, 28. The shafts 27, 28, support power transmitting rolls 29, 30, 31, 32.

Figure 5:
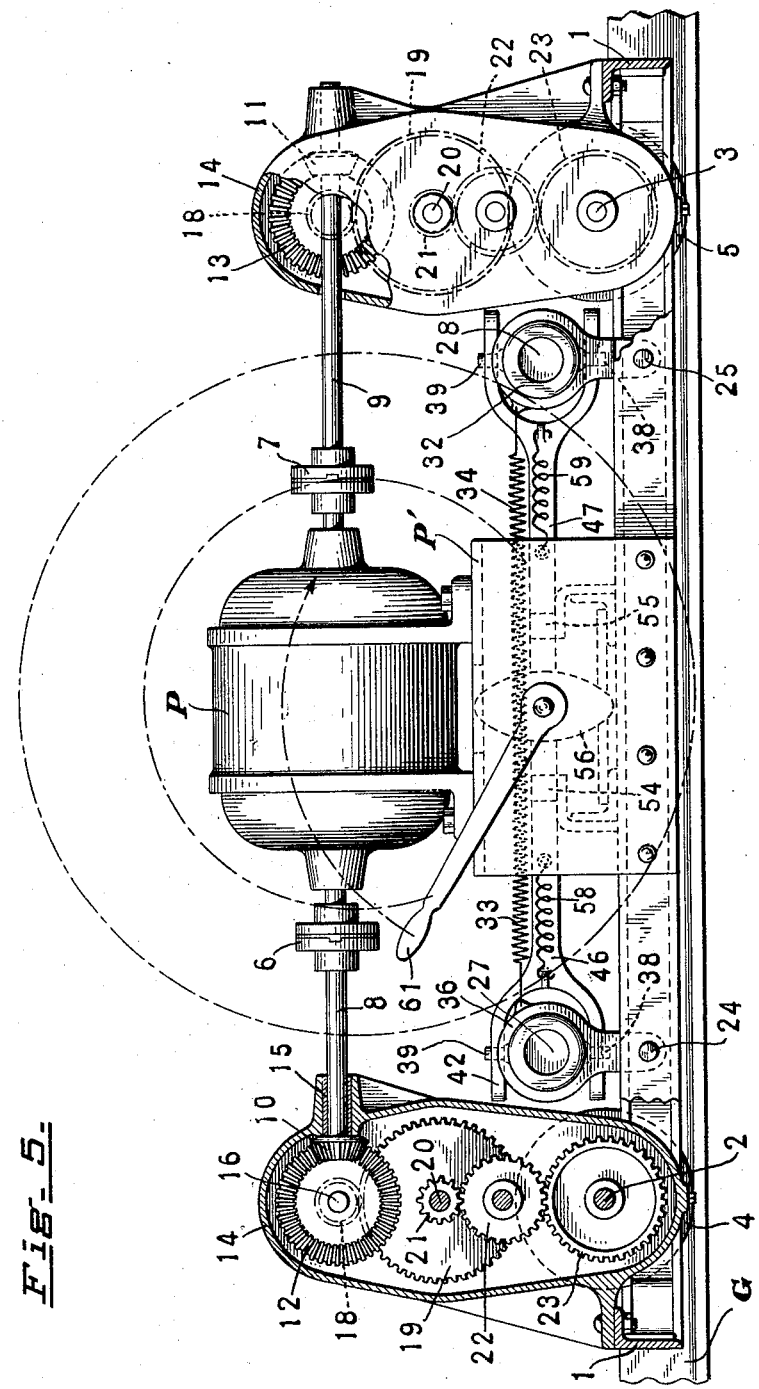
Fig. 5 is a side elevation on the line 5—5 of Figure 4, with the addition of the controlling mechanism.

These power transmitting rolls are slidable on the supporting shafts 27, 28, and in normal position have their inner ends resting against the supporting elements 26, which form stops therefor. They, of course, may be projected outward beyond the sides of the parker frame and its wheels, as illustrated in Figure 5.

The shafts 27, 28, with their respective power transmitting rolls are normally held toward each other by springs or other convenient means 33, 34, and away from the wheels 4, 5, of the parker. These springs 33, 34, are connected with rocker arm housings 36, within which the shafts 27, 28, and their rolls are carried.

These power transmitting rolls may, to give greater traction in driving, be knurled or covered with rubber, cork or any other efficient material for preventing slippage. Incidentally, the wheels 4, 5, are preferably so covered, as indicated in the drawings.

The spacing between the elements 29 and 31, and 30 and 32, is such that these power transmitting rolls may be projected fore and aft of an automobile tire without bringing them in contact with the driving wheels 4, 5, of the parker.

The rolls are each provided with a groove 35, and rocker arms 36. Within these grooves are clamped rings 37, having pins 38, 39, which are engaged by forks 40, 41, 42, 43, formed at the end of controlling levers 44, 45, 46, 47. These levers are pivoted to a frame part of the parker as at 48, 49, 50, 51, and have extended arms 52, 53, 54, 55, engaging opposite sides of cams 56, 57.

The cams illustrated are substantially of elliptical form, cam 56, being shown in position to permit the rolls 29, 31, to be moved outward under the influence of springs 58, 59, while the cam 57, is in position to retract the rolls 30, 32. These cams, as illustrated, are shown as being controlled by levers 60, 61.

A modification of the cam arrangement is illustrated in Figures 21, 22, wherein the cams are made of "box form" and engage the ends of the levers 52, 53, 54, 55, so that the levers are positively moved in both directions of their throw and are not dependent upon springs for projecting them into driving position.

Throughout the drawings, the automobile tire is illustrated in dotted outline and it will be quite apparent that when the car is to be moved, a pair of rolls 29, 31, are projected on opposite sides of the tire.

As soon as the parker is moved by its motor one or the other of the power transmitting rolls is brought into contact with the tire and thereupon is forced backward against the corresponding wheel of the parker.

Thus, the power which drives the parker is transmitted through its wheels to the power transmitting roll which is in contact with the automobile tire and the roll then acts as the transmission device for rotating the wheels of the automobiles. The direction of movement of the automobile is controlled by the direction of movement of the parker and obviously, will be rolled on its own tires backward or forward dependent upon which of the tire transmitting rolls 29, 31, (for instance) is brought into contact with the tire.

It is quite obvious that the automobile cannot overrun as it will be immediately stopped by the action of one of the power transmitting rolls. In fact, it can only move as fast as the parker moves.

It will be quite apparent that the parker exerts, not only a direct pushing effect to overcome the inertia of the automobile, but actually exerts a power drive for rotating the automobile wheels.

It is quite as apparent that two automobiles may be handled and rolled upon their tires, just as readily as one.

The power transmitting rolls, for instance, 29, 31, at one side of the parker may be brought into engagement with a tire of an automobile and although the second automobile on the opposite side is not in line with the power transmitting rolls, 30, 32, the parker may be moved along the guideway carrying with it one automobile until it is in position to pick up the second automobile on the opposite side, with the rolls 30, 32. Thereupon, the two automobiles may be simultaneously moved as expeditiously as one may be carried forward and backward.

There is, therefore, an elasticity to the parker which, applicant believes, is new in that a single automobile or a plurality of automobiles may be handled simultaneously.

It will be noted that no strain whatever is put upon any part of the automobile, as is the case where an under running parking device is employed. In such event, the parker must reach up and grip some non rotary portion of the automobile to be moved and this grip must be sufficient to insure a movement thereof. Furthermore, the automobile is never moved from its normal position of running on the ground surface. Therefore, no strains whatever, are placed upon the springs or other running gear or the chassis, to transport the automobile from one position to another.

It is conveyed in an absolutely normal manner on its own tires over a smooth road surface (namely the guideways).

The parker must obviously be capable of movement in two directions, forward and backward and it follows, without further explanation, that the power driven unit for the parker is reversible. Obviously, the details and construction of the parker may be modified to suit the exigencies of any particular requirement.

The drawings and explanations herein given show and describe a practical and operative form of device.

The elemental forms which will function to secure the results expressed may be modified to any degree without changing the spirit or intent of the invention.

Any modification which involves the rearrangement of the elemental forms by which the driving power of the parker is directly translated through shiftable power transmitting devices to rotate the wheels of an automobile for moving it backward and forward, is contemplated as falling within the invention as disclosed by the specification and set forth in the claims.

What I claim as my invention and desire to secure by Letters Patent is:

1. An apparatus for handling automobiles comprising a parker having a frame and supporting wheels, means for driving said wheels, and power transmitting means operatively arranged to engage the wheels of the parker and the wheel of an automobile for rotating the latter.

2. An apparatus for handling automobiles comprising a parker having a frame and supporting wheels, means for driving said wheels, and power transmitting means operatively arranged to engage the wheels of the parker and the wheels of a plurality of automobiles for rotating the latter.

3. An apparatus for handling automobiles comprising a parker having a frame and supporting wheels, means for driving said wheels, and power transmitting means operatively arranged to alternatively engage front and rear wheels of the parker, as said parker is moved forward and backward, said power transmitting means being adapted to engage the opposite sides of an automobile wheel for rotating the latter in one direction or another, dependent upon the direction of movement of the parker.

4. An apparatus for handling automobiles comprising a parker having a frame and supporting wheels, means for driving said wheels, and power transmitting means at opposite sides of the parker, operatively arranged to alternately engage front and rear wheels of the parker, as said parker is moved forward and backward, said power transmitting means being adapted to engage the opposite sides of a plurality of automobile tires for rotating the latter in one direction or another, dependent upon the direction of movement of the parker.

5. A parker for handling automobiles having a supporting frame and supporting wheels for the frame, means for driving said wheels and power driven transmitting devices for engaging and rotating the wheels of an automobile as the parker is driven forward or backward to roll the automobile in forward or backward direction upon its wheel tires.

6. A parker for handling automobiles having a supporting frame and supporting wheels for the frame, means for driving said wheels, and power driven transmitting devices for engaging and rotating the wheels of an automobile, at both sides of the parker, as the parker is driven forward or backward to roll the automobiles in forward or backward direction upon their wheel tires.

7. A parker for handling automobiles having a frame, supporting wheels for said frame, a motor supported on the frame, a reduction gear between the motor and the wheels, power transmitting devices adjustable with reference to the wheels and movable into and out of driving position with reference to an automobile tire, said means providing a power transmission between the parker wheels and the tire of an automobile for rotating the latter during the forward or backward movement of the parker.

8. A parker for handling automobiles having a frame and supporting wheels, a source of power on said parker for driving the wheels, a rocker shaft appurtenant to the forward and rear wheels of the parker, power transmitting rolls slidably mounted on said rocker shaft and normally out of contact with the wheels of the parker, means for moving said power transmitting rolls outwardly to engage the tire of an automobile wheel and means for moving said power transmitting rolls inwardly to disengage them from a driving position with reference to the automobile wheel, said rolls deriving power from the wheels of the parker.

9. A parker for handling automobiles having a frame, axles and supporting wheels therefor, means for driving said axles and wheels, power transmitting rolls adjustable toward and away from the wheels and adjustable longitudinally of their axes, levers for moving the rolls in longitudinal direction and a cam device for controlling the movement of the levers, said rolls, when projected, forming an intermediate power driving means between the wheels of the parker and the tire of an automobile, for rotating the latter.

10. A parker for handling automobiles having a frame, axles and supporting wheels therefor, means for driving said axles and wheels, power transmitting rolls adjustable toward and away from the wheels and adjustable longitudinally of their axial lines, means for moving the rolls in longitudinal direction for engagement and disengagement with an automobile wheel and means for imparting driving power to the rolls for rotating the automobile wheel.

11. A parker for handling automobiles having a frame, and driving wheels, a power unit for driving the wheels, adjustable power transmitting rolls adapted to be driven by the wheels and adapted to rotate an automobile wheel, the inertia of the automobile providing a means for holding the power transmitting rolls in contact with the driving wheels.

12. A parker having a frame, driving wheels and a source of power for driving said wheels, said parker being provided with adjustable power transmitting means for engaging the tires of a plurality of automobiles, said means deriving a rotary movement from the power driven wheels of the parker.

WILLIAM J. AITKEN.